(12) United States Patent
Nemoto et al.

(10) Patent No.: US 10,556,197 B2
(45) Date of Patent: Feb. 11, 2020

(54) METHOD FOR MANUFACTURING FILTER MEDIUM FOR AIR FILTER

(71) Applicants: HOKUETSU CORPORATION, Niigata (JP); The University of Tokyo, Tokyo (JP)

(72) Inventors: Junji Nemoto, Niigata (JP); Akira Isogai, Tokyo (JP); Tsuguyuki Saito, Tokyo (JP)

(73) Assignee: HOKUETSU CORPORATION, Niigata (JP)

( * ) Notice: Subject to any disclaimer, the term of this patent is extended or adjusted under 35 U.S.C. 154(b) by 54 days.

(21) Appl. No.: 15/743,866

(22) PCT Filed: Aug. 3, 2015

(86) PCT No.: PCT/JP2015/071950
§ 371 (c)(1),
(2) Date: Jan. 11, 2018

(87) PCT Pub. No.: WO2017/022052
PCT Pub. Date: Feb. 9, 2017

(65) Prior Publication Data
US 2018/0200655 A1  Jul. 19, 2018

(51) Int. Cl.
*B01D 39/18* (2006.01)
*D21F 5/00* (2006.01)
*B01D 46/00* (2006.01)

(52) U.S. Cl.
CPC ......... *B01D 39/18* (2013.01); *B01D 46/0001* (2013.01); *D21F 5/00* (2013.01); *B01D 2239/025* (2013.01); *B01D 2239/1233* (2013.01)

(58) Field of Classification Search
None
See application file for complete search history.

(56) References Cited

U.S. PATENT DOCUMENTS

| 6,048,464 | A |  | 4/2000 | Tanaka et al. |
| 6,682,576 | B1 | * | 1/2004 | Kiyotani ............ B01D 39/163 156/324 |

(Continued)

FOREIGN PATENT DOCUMENTS

| CN | 101896244 | 11/2010 |
| CN | 102405088 | 4/2012 |

(Continued)

OTHER PUBLICATIONS

Japanese Office Action dated Dec. 4, 2018 in corresponding Japanese Patent Application No. 2017-532277, 7 pages.

(Continued)

*Primary Examiner* — Dennis R Cordray
(74) *Attorney, Agent, or Firm* — Ohlandt, Greeley, Ruggiero & Perle, L.L.P.

(57) ABSTRACT

A method for manufacturing a filter medium for an air filter having improved particle collection performance using cellulose nanofibers. The method for manufacturing a filter medium for an air filter comprises: causing a mixed solution containing cellulose nanofibers and a dispersion medium to adhere to an air-permeable support; and subsequently freeze-drying the resulting product, in which a number average fiber diameter of the cellulose nanofibers is 1 to 50 nm, the dispersion medium is a mixed dispersion medium of water and a water-soluble organic solvent, and a solid content concentration of the cellulose nanofibers in the mixed solution is 0.001 to 0.150% by mass.

3 Claims, 2 Drawing Sheets

(56) References Cited

U.S. PATENT DOCUMENTS

| | | | |
|---|---|---|---|
| 2004/0168417 A1* | 9/2004 | Tanaka | B01D 39/1692 55/486 |
| 2009/0320428 A1 | 12/2009 | Soyama et al. | |
| 2013/0097982 A1* | 4/2013 | Inui | B01D 46/521 55/495 |
| 2015/0031063 A1 | 1/2015 | Charretier et al. | |
| 2015/0075406 A1* | 3/2015 | Nemoto | B01D 39/18 106/164.01 |
| 2015/0093560 A1 | 4/2015 | Nemoto et al. | |

FOREIGN PATENT DOCUMENTS

| | | |
|---|---|---|
| CN | 104114479 | 10/2014 |
| JP | 2003-082535 A | 3/2003 |
| JP | 2004-204380 A | 7/2004 |
| JP | 3941838 B | 7/2007 |
| JP | 2008001728 A | 1/2008 |
| JP | 2008-101315 A | 5/2008 |
| JP | 2010-115574 A | 5/2010 |
| JP | 2012-001626 A | 1/2012 |
| JP | 2012-081533 A | 4/2012 |
| JP | 2013-253137 A | 12/2013 |
| JP | 2015-105366 | 6/2015 |
| WO | WO 2013/183415 A1 * | 12/2013 |
| WO | 2014057564 A1 | 4/2014 |

OTHER PUBLICATIONS

Canadian Office Action dated Dec. 20, 2018 in corresponding Canadian Patent Application No. 2992253, 3 pages.

Daoussi et al. "Freeze-Drying of an Active Principle Ingredient Using Organic Co-Solvent Formulations: Influence of Freezing Conditions and Formulation on Solvent Crystals Morphology, Thermodynamics Data, and Sublimation Kinetics", Drying Technology, 29: 1858-1867, 2011, Taylor and Francis Group LLC.

International Search Report for the corresponding application PCT/JP2015/071950, 7 pages, dated Oct. 13, 2015.

Notification of Transmittal of Translation of the International Preliminary Report on Patentability dated Feb. 15, 2018 from corresponding International PCT Application PCT/JP2015/071950, 12 pages.

First Chinese Office Action dated Jun. 5, 2019 in corresponding Chinese Patent Application No. 201580082053.5, 50 pages.

European Office Action dated Sep. 3, 2019 in corresponding European Patent Application No. 15900365.6, 5 pages.

* cited by examiner

METHOD FOR MANUFACTURING FILTER MEDIUM FOR AIR FILTER

BACKGROUND

1. Field of the Disclosure

The present disclosure relates to a method for manufacturing a filter medium for an air filter, which is particularly used in air filters for an air purification facility such as a clean room or a clean bench related to a semiconductor, a liquid crystal, or a bio and food industry, and the filter medium for an air filter which is used for building air conditioning or an air filter for an air purifier, or the like.

2. Discussion of the Background Art

In order to collect particles in submicron to micron unit in the air, a filter medium for an air filter is generally used. The filter medium for an air filter is roughly classified into a filter medium for a rough dust filter, a filter medium for a medium performance filter, a filter medium for a high efficiency particulate air (HEPA) filter, and a filter medium for an ultralow penetration air (ULPA) filter depending on collection performance thereof. As basic characteristics of these filter media for an air filter, in addition to a high collection efficiency of fine dust particles, a low pressure drop is required in order to reduce energy cost for causing the air to pass through a filter.

In recent years, use of cellulose nanofibers has attracted attention. Generally, the cellulose nanofibers mean (1) a number average fiber diameter of fine cellulose nanofibers (cellulose fibers) is 1 to 100 nm or (2) a number average fiber diameter of chemically treated (modified) fine cellulose nanofibers is 1 to 100 nm. Example of the cellulose nanofibers (1) include microfibrillated cellulose and nanofibrillated cellulose (hereinafter, abbreviated as MFC and NFC) obtained by shearing and fibrillating cellulose fibers under high pressure, and fine bacterial cellulose (hereinafter, abbreviated as BC) produced by microorganisms. Examples of the modified cellulose nanofibers (2) include cellulose nanocrystals obtained by treating natural cellulose with 40% or higher concentrated sulfuric acid (hereinafter, abbreviated as CNC), and fine cellulose fibers which are ultrafine and have a uniform fiber diameter, obtained by isolating microfibrils as the smallest unit of fibers constituting a wood pulp as an aqueous dispersion by a mild chemical treatment at normal temperature and normal pressure and a minor mechanical treatment (for example, refer to Patent Literature 1).

These cellulose nanofibers are expected to be used as a filter material or a porous body. For example, there is described a method for manufacturing a leukocyte-removing filter material including a porous element having an average pore diameter of 1.0 µm or more and less than 100 µm and a fibrous structure retained in the porous element and having an average fiber diameter of 0.01 µm or more and less than 1.0 µm (for example, refer to Patent Literature 2). Patent Literature 2 uses bacterial cellulose produced by acetic acid bacteria or cellulose fibers obtained by subjecting rayon to a sulfuric acid treatment and then refining the resulting product with a homogenizer as a fibrous structure.

Generally, a nanofiber dispersion easily causes aggregation during drying without being limited to cellulose. Therefore, it is difficult to obtain a material having air-permeability. As a method for obtaining a material having air-permeability using nanofibers, there is described a method for manufacturing a porous body, including a number average diameter of dispersing nanofibers is 1 to 500 nm in a dispersion medium, causing the resulting dispersion medium to adhere to a support, and then removing the dispersion medium by freeze-drying (for example, refer to Patent Literature 3).

The cellulose nanofibers are highly hydrophilic, and therefore an aggregation force thereof acting during drying is stronger than that of nanofibers derived from a thermoplastic polymer. As a method for obtaining a material having air-permeability using cellulose nanofibers, there is described a method for manufacturing a cellulose porous body, including dispersing cellulose nanofibers in a mixed solution of water and a water-soluble organic solvent, and freeze-drying the mixed solution to remove the dispersion medium (for example, refer to Patent Literature 4).

CITATION LIST

Patent Literature

Patent Literature 1: JP 2008-1728 A
Patent Literature 2: JP 3941838 B2
Patent Literature 3: JP 2008-101315 A
Patent Literature 4: JP 2013-253137 A

Non Patent Literature

Non Patent Literature 1: R. Daoussi, E, Bogdani, S. Vessot, J. Andrieu, O. Monnier, "Drying Technology" Vol. 29 (2011), p. 1853-1867

Disclosure

Patent Literature 2 uses bacterial cellulose produced by acetic acid bacteria as the finest fibers, and an average fiber diameter thereof is 0.02 µm (=20 nm). As other fibers, cellulose fibers obtained by subjecting rayon to a sulfuric acid treatment and refining the resulting product with a homogenizer are used, and the finest cellulose fibers have an average fiber diameter of 0.19 µm (=190 nm). In a case of using bacterial cellulose, acetic acid bacteria are cultured in a porous element, but culturing conditions have many restrictions and the production amount is small, and therefore bacterial cellulose is not suitable for industrial use. In addition, the fibrous structure is formed only on a surface of the porous element, and no fibrous structure is formed inside a pore of the porous element. The cellulose fibers obtained by refining rayon are submicronfibers rather than nanofibers, and conventional micro glass fibers can be substituted for the cellulose fibers sufficiently. Patent Literature 2 does not describe dispersibility of the fine fibers used in the fibrous structure in a dispersion medium. Furthermore, the filter material of Patent Literature 2 is a filter material for liquid, and has a too low porosity as a filter medium for an air filter disadvantageously.

Patent Literature 3 describes that water is preferably used as a dispersion medium of nanofibers, and only water is used as a dispersion medium in Examples. Use of only water as a dispersion medium generates micron size crystals when water is frozen, and therefore nanofibers are aggregated around the crystals. Therefore, it is difficult to form a uniform network of nanofibers, and the resulting product is unsuitable as a filter medium for an air filter. In addition, Patent Literature 3 exemplifies a thermoplastic polymer having a number average diameter of 60 nm or more as nanofibers, but even with the same nanofibers, it is difficult to cope with a fiber diameter of 1 to 50 nm and a fiber diameter of 60 to 500 nm in a same manner because properties of a dispersion or the number of fibers are largely different therebetween. When the above-described micron size crystals of water are generated, it is absolutely impossible to obtain a uniform network of the nanofibers by nanofibers having a fiber diameter of 1 to 50 nm.

Patent Literature 4 describes a method for forming a network of cellulose nanofibers in a support, but describes checking only presence or absence of aggregation for a dispersion, and does not describe a method for preparing a dispersion for forming a more useful and uniform network as a filter medium for an air filter. In addition, Patent Literature 4 describes, in Example 12, a method for manufacturing a porous body having a mass ratio of 0.47% of cellulose nanofibers with respect to a nonwoven fabric made of glass fibers by causing a cellulose nanofiber dispersion having a solid content concentration of 0.2% by mass to adhere to the nonwoven fabric made of glass fibers. However, in this method, the solid content concentration of the cellulose nanofibers is high, and therefore the cellulose nanofibers are oriented in a dispersion medium. Furthermore, a ratio of the adhesion amount of the cellulose nanofibers with respect to the nonwoven fabric is high, and therefore the density of the nanofibers is increased. Therefore, it has been desired to obtain a uniform network of cellulose nanofibers so as to obtain a filter medium for an air filter having a lower pressure drop and higher particle collection performance.

An object of the present disclosure is to provide a method for manufacturing a filter medium for an air filter having improved particle collection performance using cellulose nanofibers.

SUMMARY

The method for manufacturing a filter medium for an air filter according to the present disclosure is a method for manufacturing a filter medium for an air filter, including: causing a mixed solution containing cellulose nanofibers and a dispersion medium to adhere to an air-permeable support; and subsequently freeze-drying the resulting product, characterized in that a number average fiber diameter of the cellulose nanofibers is 1 to 50 nm, the dispersion medium is a mixed dispersion medium of water and a water-soluble organic solvent, and a solid content concentration of the cellulose nanofibers in the mixed solution is 0.001 to 0.150% by mass.

In the method for manufacturing a filter medium for an air filter according to the present disclosure, a ratio of the adhesion amount of the cellulose nanofibers with respect to the support is preferably 0.001 to 0.200% by mass. It is possible to obtain a filter medium in which the density of the cellulose nanofibers in the filter medium for an air filter is not excessively high and a pressure drop is low.

In the method for manufacturing a filter medium for an air filter according to the present disclosure, an ambient temperature of a sample is preferably set to a temperature equal to or lower than a melting point of the mixed solution in a drying step in the freeze-drying process. Uniformity of a network of cellulose nanofibers can be further enhanced.

Disclosure

The present disclosure can provide a method for manufacturing a filter medium for an air filter having improved particle collection performance using cellulose nanofibers.

DETAILED DESCRIPTION OF THE PREFERRED EMBODIMENT

Next, the present disclosure will be described in detail by describing an embodiment, but the present disclosure is not construed as being limited to description thereof. As long as an effect of the present disclosure is exhibited, the embodiment may be modified variously.

A method for manufacturing a filter medium for an air filter according to the present embodiment is a method for manufacturing a filter medium for an air filter, including: causing a mixed solution containing cellulose nanofibers and a dispersion medium to adhere to an air-permeable support; and subsequently freeze-drying the resulting product, in which a number average fiber diameter of the cellulose nanofibers is 1 to 50 nm, the dispersion medium is a mixed dispersion medium of water and a water-soluble organic solvent, and a solid content concentration of the cellulose nanofibers in the mixed solution is 0.001 to 0.150% by mass.

<Support>

The support is not particularly limited as long as having air-permeability, and examples thereof include a nonwoven fabric, a woven fabric, paper, and a sponge. Of these supports, a nonwoven fabric is preferable, and a nonwoven fabric containing glass fibers as a main component is particularly preferable. The phrase "containing glass fibers as a main component" means that the mass of the glass fibers is 50% by mass or more with respect to the total mass of the support. Examples of a nonwoven fabric containing glass fibers as a main component include a nonwoven fabric made of glass fibers and a nonwoven fabric manufactured by blending organic fibers with glass fibers. When the support is a nonwoven fabric containing glass fibers as a main component, the basis weight is preferably 10 to 300 g/m$^2$, and more preferably 30 to 150 g/m$^2$.

Examples of the glass fibers used for the support include wool-like ultrafine glass fibers manufactured by a flame stretching method or a rotary method, and chopped strand glass fibers manufactured by cutting a bundle of glass fibers spun so as to have a predetermined fiber diameter to a predetermined fiber length. Among these fibers, fibers having various fiber diameters and fiber lengths are selected according to required physical properties, and are used singly or in mixture thereof. In addition, low boron glass fibers or silica glass fibers can also be used in order to prevent boron contamination of a silicon wafer used in a semiconductor manufacturing process. An average fiber diameter of the glass fibers is not particularly limited, but is preferably 0.05 to 20 μm. An average fiber length of the glass fibers is not particularly limited, but is preferably 0.5 to 10000 μm. Examples of the organic fibers blended with the glass fiber include acrylic fibers, vinylon fibers, polyester fibers, and aramid fibers. The average fiber diameter of the organic fibers is not particularly limited, but is preferably 0.05 to 20 μm. The average fiber length of the organic fibers is not particularly limited, but is preferably 0.5 to 10000 μm. A method for manufacturing a nonwoven fabric is not particularly limited, and is a wet method, for example.

The support itself is preferably made of a material which can be used as a filter medium for an air filter. The manufacturing method according to the present embodiment can improve filter medium performance of a conventional filter medium for an air filter (support itself).

<Cellulose Nanofibers>

Cellulose nanofibers include chemically treated (modified) cellulose nanofibers. In the cellulose nanofibers, two or more cellulose molecular chains form a bundle. The phrase "two or more cellulose molecular chains form a bundle" means a state in which two or more cellulose molecular chains are assembled to form an assembly called a microfibril. In the present embodiment, the cellulose molecular chain includes a form substituted by another functional group, such as a form in which a part or the whole of C6-position hydroxy groups in the molecule are oxidized to an aldehyde group, a carboxyl group, or the like, a form in which a part or the whole of hydroxy groups including hydroxy groups other than the C6-position hydroxy groups are esterified to a nitrate, an acetate, a phosphate, or the like, or a form in which a part or the whole of hydroxy groups including hydroxy groups other than the C6-position hydroxy groups are etherified to methyl ether, hydroxypropyl ether, carboxymethyl ether, or the like.

In the present embodiment, the number average fiber diameter of the cellulose nanofibers is 1 to 50 nm. In order to manufacture a filter medium for an air filter achieving both high particle collection performance and a low pressure drop at the same time, it is important to form a uniform fiber network in the support by making the fiber diameter ultrafine and reducing or eliminating orientation of the fibers. Use of ultrafine cellulose nanofibers having a number average fiber diameter of 1 to 50 nm significantly increases the number of fibers per unit volume in a filter medium for an air filter, makes it easy to capture particles in gas, and makes it possible to obtain high collection performance. In addition, air flow resistance of a single fiber is extremely low due to a slip flow effect, and it prevents a pressure drop as a filter medium for an air filter from increasing. A number average fiber diameter of the cellulose nanofibers is preferably 2 to 30 nm, and more preferably 3 to 20 nm. The number average fiber diameter of less than 1 nm makes single fiber strength of the cellulose nanofibers weak and makes it difficult to maintain a fiber network in a filter medium for an air filter. The number average fiber diameter of more than 50 nm reduces the number of fibers per unit volume in a filter medium for an air filter, and makes it impossible to form a network of cellulose nanofibers effective for capturing particles. Herein, the number average fiber diameter is calculated as follows. Cellulose nanofibers cast on a carbon film-coated grid are observed with an electron microscopic image using a transmission electron microscope (TEM). For the observation images thus obtained, random axes consisting of two vertical axes and two horizontal axes are drawn per image, and a fiber diameter of a fiber crossing each of the axes is visually read. At this time, observation is performed at a magnification of 5000 times, 10000 times, or 50000 times according to the size of a constituent fiber. Note that a sample or a magnification satisfying a condition that 20 or more fibers cross axes is adopted. In this way, at least three images of non-overlapping surface parts are photographed with an electron microscope, and a value of a fiber diameter of a fiber crossing the two axes is read for each of the images. Therefore, at least 20 fibers×2 axes×3 images=120 pieces of fiber information can be obtained. From the fiber diameter data thus obtained, a number average fiber diameter was calculated. Note that, for branched fibers, if the length of a branched portion is 50 nm or more, the branched portion is incorporated into calculation of a fiber diameter as one fiber.

In addition, a number average fiber length of the cellulose nanofibers is not particularly limited, but is preferably 0.01 to 20 μm. The number average fiber length of the cellulose nanofibers is more preferably 0.05 to 10 μm. The number average fiber length of the cellulose nanofibers is still more preferably 0.08 to 1.0 μm. In a case where the number average fiber length is less than 0.01 μm, the nanofibers become close to particles, and it may be impossible to form a fiber network in a filter medium for an air filter. In a case where the number average fiber length is more than 20 μm, entanglement of the nanofibers is increased, the fibers may be aggregated with each other, and it may be impossible to form a uniform network. Note that the number average fiber length is calculated by thinly casting a dispersion of cellulose nanofibers on a substrate, freeze-drying the resulting product, and observing the resulting product with an electron microscope image using a scanning electron microscope (SEM). For the observation images thus obtained, 10 independent fibers are randomly selected per image, and a fiber length thereof is visually read. At this time, observation is performed at a magnification of 5000 times or 10000 times according to the length of a constituent fiber. Note that a sample or a magnification in which a start point and an end point of a fiber are within the same image is targeted. In this way, at least 12 images of non-overlapping surface parts are photographed with SEM, and a fiber length is read. Therefore, at least 10 fibers×12 images=120 pieces of fiber information can be obtained. From the fiber diameter data thus obtained, the number average fiber length can be calculated. Note that, for a branched fiber, the length of the longest part of the fiber is taken as a fiber length.

The type of the cellulose nanofibers is not particularly limited, but examples thereof include cellulose nanofibers obtained by oxidizing cellulose with an N-oxyl compound, such as the above-described MFC, NFC, or CNC, or TEMPO described in Patent Literature 1. MFC and NFC are characterized by having a wide fiber diameter distribution because MFC and NFC are obtained by shearing cellulose fibers by a mechanical treatment to form nanofibers. CNC has a relatively uniform fiber diameter, but is characterized by having a short fiber length of 0.1 to 0.2 μm. The cellulose nanofibers described in Patent Literature 1 are cellulose single microfibrils. In natural cellulose, microfibrils are formed into many bundles to construct a high-order individual structure. Herein, the microfibrils are strongly aggregated by a hydrogen bond derived from a hydroxy group in a cellulose molecule. Cellulose single microfibrils mean microfibrils which have been isolated by subjecting natural cellulose to a chemical treatment and a minor mechanical treatment. As described in Patent Literature 1, the cellulose nanofibers described in Patent Literature 1 are characterized by being manufactured as an aqueous dispersion by oxidizing a cellulose raw material with an oxidizing agent in the presence of an N-oxyl compound, a bromide, an iodide, or a mixture thereof, further subjecting the oxidized cellulose to a wet granulation treatment, and fibrillating the resulting product to form nanofibers, and having a uniform fiber diameter. Among these fibers, the fine cellulose described in Patent Literature 1 is particularly preferable in terms of a fact that energy necessary for production is smaller than that of other cellulose fibers and productivity is high. In the cellulose nanofibers described in Patent Literature 1, a part of hydroxy groups of a cellulose molecule have been oxidized to at least one functional group selected from the group consisting of a carboxyl group and an aldehyde group, and has a cellulose type I crystal structure. The cellulose nanofibers have a maximum fiber diameter of 1000 nm or less. These cellulose nanofibers turn into a transparent liquid when being dispersed in water.

A cellulose material as a raw material of the cellulose nanofibers is not particularly limited, but is preferably a plant type pulp, particularly preferably a wood type pulp. Examples of the plant type pulp which can be used include kraft pulps derived from various types of woods, such as a leaf bleached kraft pulp (LBKP) or a needle bleached kraft pulp (NBKP); a sulfite pulp; a used paper pulp such as a deinked pulp (DIP); a mechanical pulp such as a ground pulp (GP), a pressure groundwood pulp (PGW), a refiner mechanical pulp (RMP), a thermomechanical pulp (TMP), a chemithermomechanical pulp (CTMP), a chemimechanical pulp (CMP), or a chemiground pulp (CGP); powdered cellulose pulverized with a high-pressure homogenizer, a mill, or the like; and microcrystalline cellulose powder obtained by purifying the cellulose by a chemical treatment such as acid hydrolysis. A plant-derived non-wood pulp such as kenaf, hemp, rice, bagasse, bamboo, or cotton can also be used. The present embodiment is not limited to a raw material of the nanofibers and a method for manufacturing the nanofibers.

The method for manufacturing nanofibers is, for example, a manufacturing method described in Patent Literature 1. According to Patent Literature 1, a method for manufacturing nanofibers includes an oxidation reaction step of oxidizing natural cellulose as a raw material using an N-oxyl compound such as TEMPO as an oxidation catalyst in water by an action of a cooxidant to obtain reaction product fibers, a purification step of removing impurities to obtain reaction product fibers containing water, and a fibrillating step of dispersing the reaction product fibers containing water as cellulose nanofibers in a dispersion medium.

<Dispersion Medium>

The dispersion medium is a mixed dispersion medium obtained by mixing water and a water-soluble organic solvent. Herein, the organic solvent means an organic compound which is a liquid at normal temperature and normal pressure. Furthermore, the term "water-soluble" means that, in a mixed dispersion medium obtained by mixing water and an organic solvent, a mixing mass ratio between water and the organic solvent is within a range of 98:2 to 50:50, and water and the organic solvent are mixed at a molecular level and do not cause phase separation. A fact that a dispersion medium is a mixture of water and a water-soluble organic solvent suppresses crystallization of the dispersion medium during freeze-drying and contributes to formation of a uniform network of cellulose nanofibers. In the present disclosure, the organic solvent in the mixed dispersion medium preferably has a concentration of 2 to 50% by mass. The concentration is more preferably 5 to 40% by mass, and still more preferably 10 to 30% by mass. The concentration of the organic solvent of more than 50% by mass may form a highly hydrophobic dispersion medium, and may cause the hydrophilic cellulose nanofibers not to be uniformly dispersed in the mixed solution. Furthermore, the concentration of the organic solvent of less than 2% by mass may significantly form water crystals (ice crystals) at the time of freezing of the dispersion medium, may cause aggregation and structural destruction of the cellulose nanofibers, and may make it impossible to form a uniform network of the cellulose nanofibers in a support.

The organic solvent preferably contains at least one of an alcohol, a carboxylic acid, and a carbonyl compound. By inclusion of such an organic solvent, water crystals (ice crystals) generated during freeze-drying can be smaller, and formation of a network of cellulose nanofibers in a support can be more uniform. In addition, the organic solvent more preferably contains at least one of (1) to (6) including (1) methanol, (2) ethanol, (3) 1-propanol, and (4) t-butyl alcohol as alcohols, (5) acetic acid as a carboxylic acid, and (6) acetone as a carbonyl compound from a viewpoint of compatibility with water. Among these compounds, the organic solvent particularly preferably contains only t-butyl alcohol. The freezing point of a mixed dispersion medium obtained by mixing water and t-butyl alcohol is about −10° C. at the lowest, which is higher than that of a mixed dispersion medium of another organic solvent and water, and it is easy to freeze the mixed dispersion medium of water and t-butyl alcohol. In the t-butyl alcohol aqueous solution, it is known that water and t-butyl alcohol are eutectic and the crystal size at the time of freezing is the smallest when the concentration of t-butyl alcohol is around 20% by mass. In a case where the organic solvent contains only t-butyl alcohol, the concentration of t-butyl alcohol in the mixed dispersion medium is preferably 15 to 30% by mass, and more preferably 20 to 25% by mass.

<Mixed Solution>

In the present embodiment, the solid content concentration of the cellulose nanofibers in the mixed solution is set to 0.001 to 0.150% by mass. The solid content concentration of the cellulose nanofibers is preferably 0.005 to 0.100% by mass, and more preferably 0.010 to 0.080% by mass. In order to form a network of the cellulose nanofibers in an air-permeable support to obtain a filter medium for an air filter, it is important to uniformly dispose the network of the cellulose nanofibers without a specific directionality. In a case where the network of the cellulose nanofibers in the support is disposed with a specific directionality (while being oriented), particle capturing performance as a filter medium for an air filter cannot be satisfactorily improved. In a case where the solid content concentration of the cellulose nanofibers in the mixed solution is more than 0.150% by mass, many domains in which fibers are oriented are easily formed. The phrase "fibers are oriented" means that fibers are arranged in the same direction to a certain extent, and orientation is not preferable for a filter medium for an air filter having higher particle capturing performance as the dispersion degree of fibers is higher. In addition, the density of the cellulose nanofibers in a filter medium for an air filter is excessively high, and the cellulose nanofibers may be aggregated due to moisture in the air. A dispersion of cellulose nanofibers obtained by oxidizing cellulose using an N-oxyl compound such as TEMPO has high transparency in water and has the cellulose nanofibers uniformly dispersed, but the fibers are particularly easily oriented when the concentration is high. In the present embodiment, by setting the solid content concentration of the cellulose nanofibers in the mixed solution to 0.150% by mass or less, a distance between the fibers in the mixed solution is appropriately widened, and the cellulose nanofibers are not oriented at all or almost at all. Therefore, even when the cellulose nanofibers are incorporated in a filter medium for an air filter, it is possible to form a uniform fiber network without a specific directionality, and an effect of significantly increasing particle collection performance is exhibited as the filter medium for an air filter. Meanwhile, in a case where the concentration of the cellulose nanofibers in the mixed solution is less than 0.001% by mass, entanglement between the cellulose nanofibers is reduced, and a network structure cannot be maintained.

<Preparation of Mixed Solution>

In the present embodiment, a method for preparing the mixed solution is not particularly limited, but the mixed solution is preferably prepared by dispersing cellulose nanofibers in water to prepare a cellulose nanofiber aqueous dispersion, and then adding an organic solvent or a mixed solvent of water and an organic solvent to the cellulose nanofiber aqueous dispersion. Herein, in a case where the cellulose nanofibers are the cellulose nanofibers described in Patent Literature 1, as a cellulose nanofiber aqueous dispersion, a cellulose nanofiber dispersion obtained in a dispersion step described in Patent Literature 1 may be used as it is, or the cellulose nanofiber dispersion may be once dried to obtain fine cellulose fibers, and then the fine cellulose fibers may be dispersed again in water. It is more preferable to use the cellulose nanofiber dispersion obtained in the dispersion step as it is in terms of working efficiency. It is preferable to use the cellulose nanofiber dispersion obtained in the dispersion step by diluting or concentrating the cellulose nanofiber dispersion so as to have a desired concentration. The solid content concentration of the cellulose nanofibers in the cellulose nanofiber aqueous dispersion is preferably 0.001 to 5.000% by mass, and more preferably 0.010 to 1.000% by mass. A method for mixing the cellulose nanofiber aqueous dispersion with an organic solvent or a mixed solvent is not particularly limited, but examples thereof include a method using a magnetic stirrer, a propeller type mixer, a screw type mixer, a paddle mixer, a disper type mixer, or a turbine type mixer. It is also possible to use a more powerful apparatus such as a homomixer under high speed rotation, a high pressure homogenizer, an ultrahigh pressure homogenizer, an ultrasonic disperser, a beater, a disc type refiner, a conical type refiner, a double disc type refiner, or a grinder. In a step of preparing the mixed solution, by adding a cellulose nanofiber aqueous dispersion to an organic solvent, there is a case that aggregates may be generated.

In the present embodiment, various auxiliaries such as a freeze-drying stabilizer or a surface modifier of cellulose nanofibers may be blended with the mixed solution. Examples of the freeze-drying stabilizer include sucrose, trehalose, L-arginine, and L-histidine. Furthermore, examples of the surface modifier of cellulose nanofibers include a cationic surfactant, an anionic surfactant, a nonionic surfactant, and an amphoteric surfactant. It is preferable to add various auxiliaries to the cellulose nanofiber aqueous dispersion before an organic solvent is added.

<Adhesion Step>

A method for causing a mixed solution to adhere to a support is not particularly limited, but examples thereof include an impregnation method, a coating method, and a spraying method. The adhesion amount of the mixed solution with respect to the support is appropriately adjusted according to the thickness, the material, and the average pore diameter of the support, but in the present embodiment, a ratio of the adhesion amount of the cellulose nanofibers with respect to the support is preferably 0.001 to 0.200% by mass. The adhesion amount is more preferably 0.010 to 0.150% by mass, and still more preferably 0.050 to 0.100% by mass. By setting the ratio of the adhesion amount of the cellulose nanofibers with respect to the support to 0.001 to 0.200% by mass, it is possible not only to improve particle collection performance but also to manufacture a filter medium for an air filter having a low pressure drop and a high efficiency. In a case where the ratio of the adhesion amount of the cellulose nanofibers with respect to the support is less than 0.001% by mass, the adhesion amount of the cellulose nanofibers to the support is insufficient, and it is difficult to form a uniform network of the cellulose nanofibers. As a result, it may be impossible to improve particle collection performance as a filter medium for an air filter sufficiently. On the contrary, in a case where the ratio of the adhesion amount is more than 0.200% by mass, the density of the cellulose nanofibers in a filter medium for an air filter is excessively high, and the cellulose nanofibers may be aggregated due to moisture in the air. In addition, it may be impossible to obtain a filter medium having a low pressure drop due to poor air-permeability. In the present disclosure, the ratio of the adhesion amount of the cellulose nanofibers with respect to the support can be calculated by the wet adhesion amount. That is, the ratio (unit %) of the adhesion amount of the cellulose nanofibers with respect to the support is obtained by {(wet adhesion amount×solid content concentration of cellulose nanofibers in mixed solution)/mass of support before adhesion of mixed solution}× 100. Herein, the wet adhesion amount is a difference between the mass of the support in a wet state to which the mixed solution adheres and the mass of the support before adhesion, and means the mass of the mixed solution adhering to the support during freeze-drying. Therefore, the wet adhesion amount is preferably a value measured immediately before freeze-drying, and for example, is preferably measured within 10 minutes before start of freeze-drying, and more preferably measured within 5 minutes.

Examples of the impregnation method include a method for impregnating a support completely with a mixed solution and a method for impregnating only a surface of a support with a mixed solution. The method for impregnating a support completely with a mixed solution is excellent in being able to form a more uniform network of cellulose nanofibers because the mixed solution can permeate a deep portion inside a pore of the support efficiently and reliably. In addition, decrease in pressure with a support completely impregnated with a mixed solution easily removes air in the support, and therefore is more effective for permeation of the mixed solution. Note that the excessively adhering mixed solution is preferably squeezed out with a roll dehydrator or the like, or removed with a water absorbing member such as water-absorbing felt or water absorbing paper. The method for impregnating only a surface of a support with a mixed solution is effective in a case of providing a density difference of a network structure of cellulose nanofibers in a pore in the thickness direction of the support (in a case of making a presence ratio of the network structure of the cellulose nanofibers on one side of the support different from that on the other side).

The coating method is a method for coating a surface of a support with a mixed solution using a known coater. Examples of the known coater include an air knife coater, a roll coater, a bar coater, a comma coater, a blade coater, and a curtain coater (die coater). The coating method is excellent in easily controlling the adhesion amount of a mixed solution to a support.

The spraying method is a method for spraying a mixed solution onto a surface of a support using a known atomizer such as a sprayer. The spraying method is effective, for example, in a case where it is desired to form a network structure of cellulose nanofibers only in the vicinity of a surface of a support among pores of the support, or in a case where it is desired to reduce the thickness of the network structure.

<Freeze-Drying Step>

In the present embodiment, as described above, the mixed solution is caused to adhere to the support, the support is brought into a wet state, and then the resulting product is freeze-dried. Herein, freeze-drying is a method for freezing a mixed solution together with a support (freezing step), reducing the pressure while a frozen state is maintained, and subliming a dispersion medium for drying (drying step). A method for freezing a mixed solution in the freezing step is not particularly limited, but examples thereof include a method for freezing a support to which a mixed solution adheres in a refrigerant such as liquid nitrogen, a method for freezing a support to which a mixed solution adheres on a cooled plate, a method for freezing a support to which a mixed solution adheres in a low-temperature atmosphere, and method for freezing a support to which a mixed solution adheres under reduced pressure. The method for freezing a support to which a mixed solution adheres in a refrigerant is preferable. A freezing temperature of the mixed solution should be equal to or lower than a freezing point of a mixed dispersion medium in the mixed solution, is preferably −50° C. or lower, and more preferably −100° C. or lower. A high freezing temperature, that is, a slow freezing rate may make crystals of a dispersion medium large even by using a mixed dispersion medium obtained by mixing water and an organic solvent, and may concentrate cellulose nanofibers around crystals to generate aggregates. Meanwhile, by making the freezing temperature sufficiently lower than a freezing point of a mixed dispersion medium, that is, by increasing the freezing rate, the dispersion medium can be frozen in a state close to an amorphous state.

In the present embodiment, it is preferable to set an ambient temperature of a sample to a temperature equal to or lower than a melting point of a mixed solution in the drying step in the freeze-drying process. Herein, the drying step in the freeze-drying process means a period in which a dispersion medium is sublimated from a sample in a frozen state under reduced pressure. An ambient temperature of a sample is usually room temperature unless specifically controlled. In this way, when an ambient temperature of a sample is higher than a melting point of a mixed solution, a part of a frozen mixed solution may melt, and uniformity of a network of cellulose nanofibers may be lost. For example, when a dispersion medium is a mixed dispersion medium of water and t-butyl alcohol and t-butyl alcohol in the mixed dispersion medium has a concentration of more than 0 and 50% by mass or less, a melting point of a mixed solution containing nanofibers and the dispersion medium is equal to a melting point of the dispersion medium. According to Non Patent Literature 1, a melting point of a mixed dispersion medium of water and t-butyl alcohol is −8.2° C. at the lowest. Therefore, when a dispersion medium is a mixed dispersion medium of water and t-butyl alcohol and t-butyl alcohol in the mixed dispersion medium has a concentration of more than 0 and 50% by mass or less, an ambient temperature of a sample is preferably set to −8.2° C. or lower, more preferably −15° C. or lower, and still more preferably −20° C. or lower. A lower limit of an ambient temperature of a sample varies depending on the type of a dispersion medium, but is preferably −30° C. or higher, for example, when a mixed dispersion medium of water and t-butyl alcohol is used.

A melting point of a mixed solution can be determined from the first endothermic point which occurs when the mixed solution changes from solid to liquid. The melting point of the mixed solution may be measured, for example, from a start point of the first endothermic peak of a DSC curve obtained with a differential scanning calorimeter (DSC).

In the present embodiment, the pressure in the drying step in the freeze-drying process is preferably 200 Pa or less, and more preferably 50 Pa or less. A pressure of more than 200 Pa may melt a dispersion medium in a frozen mixed solution.

<Filter Medium for Air Filter>

Examples of a filter medium for an air filter obtained by the manufacturing method according to the present embodiment include a filter medium for a rough dust filter, a filter medium for a medium performance filter, a filter medium for a HEPA filter, and a filter medium for a ULPA filter. In addition, the filter medium for an air filter obtained by the manufacturing method according to the present embodiment can be applied as a dust mask or a mask for protecting contaminants such as pollen and viruses.

A PF value of the filter medium for an air filter obtained by the manufacturing method according to the present embodiment is preferably higher than a PF value of a support by 0.5 or more under conditions that a surface wind speed is 5.3 cm/sec and a target particle diameter is 0.10 to 0.15 μm. The PF value is an index for evaluating superiority or inferiority of a balance between a pressure drop and a collection efficiency, and is calculated using a formula indicated in numerical formula 1. A higher PF value indicates a filter medium for an air filter having a higher collection efficiency of target particles and a lower pressure drop. For example, when a filter medium for an air filter is used as a filter medium for a HEPA filter or a filter medium for a ULPA filter, a PF value thereof is preferably 11.4 or more, and more preferably 12.0 or more.

$$PF_{value} = \frac{\log_{10}(PAO_{penetration}[\%]/100)}{\text{Pressure drop}[Pa]/9.81} \times (-100) \quad \text{[Numerical formula 1]}$$

In numerical formula 1, the pressure drop is a differential pressure when the air passes through a filter medium for an air filter having an effective area of 100 cm$^2$ at a surface wind speed of 5.3 cm/sec. The pressure drop is measured using a manometer, for example. In addition, the PAO penetration is a ratio of polydisperse polyalphaolefin (PAO) particles generated by a Raskin nozzle, having a target particle diameter of 0.10 to 0.15 μm, passing through a filter medium for an air filter having an effective area of 100 cm$^2$, when the air containing the PAO particles passes through the filter medium for an air filter at a surface wind speed of 5.3 cm/sec. The PAO penetration is measured using a laser particle counter, for example.

EXAMPLES

Next, the present disclosure will be described more specifically with reference to Examples, but the present disclosure is not limited to these Examples. In addition, "part" and "%" in Examples indicate "part by mass" and "% by mass", respectively, unless otherwise specified. Note that the number of addition parts is a value in terms of solid content.

[Step of Preparing Cellulose Nanofiber Aqueous Dispersion A]

NBKP (mainly formed of fibers having a fiber diameter of more than 1000 nm) equivalent to 2.00 g in terms of dry weight, 0.025 g of TEMPO (2,2,6,6-tetramethylpiperidine-1-oxy radical), and 0.25 g of sodium bromide were dispersed in 150 ml of water, and then a 13% sodium hypochlorite aqueous solution was added to 1.00 g of pulp (NBKP) such that the amount of sodium hypochlorite was 5.00 mmol to initiate a reaction. During the reaction, a 0.50 mol/l sodium hydroxide aqueous solution was added dropwise to maintain the pH at 10. The reaction was performed for 2 hours, and then the reaction product was filtered and thoroughly washed with water to obtain an oxidized cellulose (TEMPO oxidized cellulose) slurry. A 0.5% by mass TEMPO oxidized cellulose slurry was fibrillated for 5 minutes at 15000 rpm using a biomixer (BM-2, manufactured by Nippon Seiki Seisakusho Co., Ltd.), the resulting product was diluted so as to have solid content concentration of 0.2% by mass, and then the resulting product was further fibrillated for 20 minutes using an ultrasonic disperser (type US-300E, manufactured by Nippon Seiki Seisakusho Co., Ltd.). Thereafter, coarse fibers were removed by centrifugation to obtain a cellulose nanofiber aqueous dispersion A in which TEMPO oxidized cellulose nanofibers were dispersed in water. This aqueous dispersion A was analyzed using an observation image observed with a TEM (JEM2000-EXII, manufactured by JEOL Ltd.) at a magnification of 50000 times, and as a result, a number average fiber diameter was 4 nm. In addition, this aqueous dispersion A was analyzed using an observation image observed with a SEM (SU8010, manufactured by Hitachi High-Technologies Corporation) at a magnification of 10000 times, and as a result, a number average fiber length was 0.8 µm. The obtained cellulose nanofiber aqueous dispersion A was concentrated with a rotary evaporator until the solid content concentration became 0.5%, and the resulting product was used in the subsequent steps.

[Step of Preparing Cellulose Nanofiber Aqueous Dispersion B]

BiNFi-s WMa-10002 (manufactured by SUGINO MACHINE LIMITED), which is a commercially available cellulose nanofiber, was used as a raw material for a cellulose nanofiber aqueous dispersion B. BiNFi-s WMa-10002 having a solid content concentration of 0.2%, dispersed in water was macerated with a household mixer to obtain the cellulose nanofiber aqueous dispersion B. The cellulose nanofibers thus obtained were analyzed using an observation image observed with a TEM at a magnification of 30000 times, and as a result, a number average fiber diameter was 35 nm.

[Step of Preparing Cellulose Nanofiber Aqueous Dispersion C]

CELISH KY-100G (manufactured by Daicel Chemical Industries, Ltd.), which is a commercially available cellulose nanofiber, was used as a raw material for the cellulose nanofiber aqueous dispersion C. CELISH KY-100G having a solid content concentration of 0.2%, dispersed in water was macerated with a household mixer, and then coarse fibers were removed by centrifugation to obtain a cellulose nanofiber aqueous dispersion C. The cellulose nanofibers thus obtained were analyzed using an observation image observed with a TEM at a magnification of 20000 times, and as a result, a number average fiber diameter was 64 nm. The obtained cellulose nanofiber aqueous dispersion C was concentrated with a rotary evaporator until the solid content concentration became 0.2%, and the resulting product was used in the subsequent steps.

Example 1

Water and t-butyl alcohol were added to the cellulose nanofiber aqueous dispersion A, the container was covered with a lid and was stirred with a magnetic stirrer for 5 minutes to obtain a mixed solution. The solid content concentration of the cellulose nanofibers with respect to the total mass of the mixed solution was 0.010%. In addition, a mixing ratio between water and t-butyl alcohol in the mixed solution was 70:30 in mass ratio. This mixed solution was caused to adhere to a nonwoven fabric formed of glass fibers having a basis weight of 64 g/m² and a pressure drop of 305 Pa (containing 65 parts of ultrafine glass fibers having an average fiber diameter of 0.65 µm, 25 parts of ultrafine glass fibers having an average fiber diameter of 2.7 µm, and 10 parts of chopped glass fibers having an average fiber diameter of 6 µm) as a support with a handy spray, and the mass of the support in a wet state (before drying) was measured. The wet adhesion amount was determined from a difference between the mass of the support in the wet state and the mass of the support before wetting. A ratio of the adhesion amount of the cellulose nanofibers with respect to the support, calculated from the wet adhesion amount was 0.008%. The support in the wet state was frozen in liquid nitrogen (−196° C.), and the frozen support was put in a freeze-drying bottle which had been previously cooled to −20° C. Thereafter, the whole of the freeze-drying bottle was put in a freezer set at −20° C., the pressure was reduced with a freeze dryer (VD-250F manufactured by TAITEC CORPORATION) connected with a vacuum tube, and a dispersion medium in the support was sublimated to obtain a filter medium for an air filter. Note that the pressure at the time of reaching the vacuum was 50 Pa or less. According to Non-Patent Literature 1, a melting point of a mixed dispersion medium of water and t-butyl alcohol is −8.2° C. at the lowest, and therefore an ambient temperature (−20° C.) of a sample is a temperature equal to or lower than a melting point of a mixed solution.

Example 2

A filter medium for an air filter was obtained in a same manner to Example 1 except that a ratio of the adhesion amount of the cellulose nanofibers with respect to the support was 0.023% by adjusting the wet adhesion amount of the mixed solution to the support.

Example 3

A filter medium for an air filter was obtained in a same manner to Example 1 except that a ratio of the adhesion amount of the cellulose nanofibers with respect to the support was 0.045% by adjusting the wet adhesion amount of the mixed solution to the support.

Example 4

A filter medium for an air filter was obtained in a same manner to Example 1 except that a ratio of the adhesion amount of the cellulose nanofibers with respect to the support was 0.003% by setting a solid content concentration of the cellulose nanofibers with respect to the total mass of the mixed solution to 0.001% and adjusting the wet adhesion amount of the mixed solution to the support.

Example 5

A filter medium for an air filter was obtained in a same manner to Example 1 except that a ratio of the adhesion amount of the cellulose nanofibers with respect to the support was 0.045% by setting a mixing ratio between water and t-butyl alcohol in the mixed solution to 98:2 in mass ratio and adjusting the wet adhesion amount of the mixed solution to the support.

Example 6

A filter medium for an air filter was obtained in a same manner to Example 1 except that a ratio of the adhesion amount of the cellulose nanofibers with respect to the support was 0.045% by setting a mixing ratio between water and t-butyl alcohol in the mixed solution to 80:20 in mass ratio and adjusting the wet adhesion amount of the mixed solution to the support.

Example 7

A filter medium for an air filter was obtained in a same manner to Example 1 except that a ratio of the adhesion amount of the cellulose nanofibers with respect to the support was 0.045% by setting a mixing ratio between water and t-butyl alcohol in the mixed solution to 50:50 in mass ratio and adjusting the wet adhesion amount of the mixed solution to the support.

Example 8

A filter medium for an air filter was obtained in a same manner to Example 1 except that a ratio of the adhesion amount of the cellulose nanofibers with respect to the support was 0.081% by adjusting the wet adhesion amount of the mixed solution to the support.

Example 9

A filter medium for an air filter was obtained in a same manner to Example 1 except that a ratio of the adhesion amount of the cellulose nanofibers with respect to the support was 0.190% by setting a solid content concentration of the cellulose nanofibers with respect to the total mass of the mixed solution to 0.030% and adjusting the wet adhesion amount of the mixed solution to the support.

Example 10

A filter medium for an air filter was obtained in a same manner to Example 1 except that the cellulose nanofiber aqueous dispersion B was used in place of the cellulose nanofiber aqueous dispersion A, and a ratio of the adhesion amount of the cellulose nanofibers with respect to the support was 0.020% by setting a solid content concentration of the cellulose nanofibers with respect to the total mass of the mixed solution to 0.010% and adjusting the wet adhesion amount of the mixed solution to the support.

Example 11

A filter medium for an air filter was obtained in a same manner to Example 1 except that a ratio of the adhesion amount of the cellulose nanofibers with respect to the support was 0.250% by setting a solid content concentration of the cellulose nanofibers with respect to the total mass of the mixed solution to 0.05% and adjusting the wet adhesion amount of the mixed solution to the support.

Comparative Example 1

The support made of glass fibers in Example 1 was used as a filter medium for an air filter.

Comparative Example 2

A filter medium for an air filter was obtained in a same manner to Example 1 except that only water was added to the cellulose nanofiber aqueous dispersion A without adding t-butyl alcohol to obtain a mixed solution and a ratio of the adhesion amount of the cellulose nanofibers with respect to the support was 0.045% by adjusting the wet adhesion amount of the mixed solution to the support.

Comparative Example 3

A filter medium for an air filter was obtained in a same manner to Example 1 except that a solid content concentration of the cellulose nanofibers with respect to the total mass of the mixed solution was 0.0001% and a ratio of the adhesion amount of the cellulose nanofibers with respect to the support was 0.0008% by adjusting the wet adhesion amount of the mixed solution to the support.

Comparative Example 4

A filter medium for an air filter was obtained in a same manner to Example 2 except that the cellulose nanofiber aqueous dispersion C was used in place of the cellulose nanofiber aqueous dispersion A.

Example 12

A filter medium for an air filter was obtained in a same manner to Example 1 except that a nonwoven fabric having a basis weight of 55 g/m$^2$ and a pressure drop of 45 Pa was used as a support and a ratio of the adhesion amount of the cellulose nanofibers with respect to the support was 0.056%. Herein, the support included 12 parts of ultrafine glass fibers having an average fiber diameter of 0.65 μm, 43 parts of ultrafine glass fibers having an average fiber diameter of 5.5 μm, 25 parts of chopped glass fibers having an average fiber diameter of 6 μm, and 20 parts of organic fibers (PET) having an average fiber diameter of 7.4 μm and a fiber length of 5 mm, and a ratio of the mass of the glass fibers to the total mass of the support was 80%.

Example 13

A filter medium for an air filter was obtained in a same manner to Example 12 except that the solid content concentration of the cellulose nanofibers with respect to the total mass of the mixed solution was 0.100%.

Example 14

A filter medium for an air filter was obtained in a same manner to Example 12 except that the solid content concentration of the cellulose nanofibers with respect to the total mass of the mixed solution was 0.150%.

Comparative Example 5

A support manufactured by blending organic fibers with the glass fibers used in Example 12 was used as a filter medium for an air filter.

Comparative Example 6

A filter medium for an air filter was obtained in a same manner to Example 11 except that a solid content concentration of the cellulose nanofibers with respect to the total mass of the mixed solution was 0.200% and a ratio of the adhesion amount of the cellulose nanofibers with respect to the support was 0.056% by adjusting the wet adhesion amount of the mixed solution to the support.

Comparative Example 7

A filter medium for an air filter was obtained in a same manner to Example 12 except that a solid content concentration of the cellulose nanofibers with respect to the total mass of the mixed solution was 0.200% and a ratio of the adhesion amount of the cellulose nanofibers with respect to the support was 0.470% by adjusting the wet adhesion amount of the mixed solution to the support.

The compositions and physical property values of the filter media for an air filter obtained in Examples and Comparative Examples are indicated in Table 1. The physical property values were measured by the following methods.

cm/sec was measured using a manometer. A lower measured value indicates a filter medium for an air filter having a higher air-permeability.

"Particle Penetration"

For the particle penetration, the PAO penetration calculated from a ratio between the number of particles at upstream and the number of particles at downstream when the air containing polydisperse polyalphaolefin (PAO) particles generated by a Raskin nozzle passed through a filter medium for an air filter having an effective area of 100 cm$^2$ at a surface wind speed of 5.3 cm/sec was measured using a laser particle counter (LASAIR-1001, manufactured by PMS). Note that the target particle diameter was 0.10 to 0.15 μm. A lower measured value indicates a higher collection efficiency of target particles.

"PF Value"

TABLE 1

| | Mixed solution | | | | Physical properties of filter | | | |
|---|---|---|---|---|---|---|---|---|
| | Number average fiber diameter of cellulose nanofibers [nm] | Dispersion medium | Concentratioin of organic solvent in disersion medium [%] | Solid content concentration of cellulose nanofibers in mixed solution [%] | Adhesion amount of cellulose nanofibers with respect to support [%] | Pressure drop [Pa] | Particle penetration [%] | PF value | Evaluation of network |
| Example 1 | 4 | Water/t-butyl alcohol | 30 | 0.010 | 0.008 | 318 | 9.5E−03 | 12.4 | 2 |
| Example 2 | 4 | Water/t-butyl alcohol | 30 | 0.010 | 0.023 | 325 | 3.3E−03 | 13.5 | 1 |
| Example 3 | 4 | Water/t-butyl alcohol | 30 | 0.010 | 0.045 | 345 | 4.0E−04 | 15.3 | 1 |
| Example 4 | 4 | Water/t-butyl alcohol | 30 | 0.001 | 0.003 | 313 | 1.3E−02 | 12.2 | 2 |
| Example 5 | 4 | Water/t-butyl alcohol | 2 | 0.010 | 0.045 | 320 | 1.9E−02 | 11.4 | 3 |
| Example 6 | 4 | Water/t-butyl alcohol | 20 | 0.010 | 0.045 | 350 | 4.2E−04 | 15.1 | 1 |
| Example 7 | 4 | Water/t-butyl alcohol | 50 | 0.010 | 0.045 | 348 | 4.5E−04 | 15.1 | 1 |
| Example 8 | 4 | Water/t-butyl alcohol | 30 | 0.010 | 0.081 | 380 | 2.3E−04 | 14.6 | 1 |
| Example 9 | 4 | Water/t-butyl alcohol | 30 | 0.030 | 0.190 | 486 | 2.1E−04 | 11.5 | 3 |
| Example 10 | 35 | Water/t-butyl alcohol | 30 | 0.010 | 0.020 | 312 | 2.3E−02 | 11.4 | 2 |
| Example 11 | 4 | Water/t-butyl alcohol | 30 | 0.050 | 0.250 | 525 | 1.9E−04 | 10.7 | 3 |
| Comparative Example 1 | — | — | — | — | — | 305 | 4.0E−02 | 10.9 | — |
| Comparative Example 2 | 4 | Water | 0 | 0.010 | 0.045 | 303 | 4.3E−02 | 10.9 | 5 |
| Comparative Example 3 | 4 | Water/t-butyl alcohol | 30 | 0.0001 | 0.0008 | 304 | 4.2E−02 | 10.9 | 4 |
| Comparative Example 4 | 64 | Water/t-butyl alcohol | 30 | 0.010 | 0.023 | 311 | 2.8E−02 | 11.2 | 4 |
| Example 12 | 4 | Water/t-butyl alcohol | 30 | 0.010 | 0.056 | 68 | 7.6E+00 | 16.1 | 1 |
| Example 13 | 4 | Water/t-butyl alcohol | 30 | 0.100 | 0.056 | 61 | 2.3E+01 | 10.3 | 3 |
| Example 14 | 4 | Water/t-butyl alcohol | 30 | 0.150 | 0.056 | 57 | 2.7E+01 | 9.8 | 3 |
| Comparative Example 5 | — | — | — | — | — | 45 | 3.8E+01 | 9.2 | — |
| Comparative Example 6 | 4 | Water/t-butyl alcohol | 30 | 0.200 | 0.056 | 56 | 3.1E+01 | 8.9 | 5 |
| Comparative Example 7 | 4 | Water/t-butyl alcohol | 30 | 0.200 | 0.470 | 189 | 1.6E+01 | 4.1 | 5 |

"Pressure Drop"

For the pressure drop, a differential pressure when the air passed through a filter medium for an air filter having an effective area of 100 cm$^2$ at a surface wind speed of 5.3

The PF value was calculated from the measured values of the pressure drop and the PAO penetration using the formula indicated in numerical formula 1. Note that the target particle diameter was 0.10 to 0.15 μm. A higher PF value indicates a filter medium for an air filter having a higher collection efficiency of target particles and a lower pressure drop.

$$PF_{value} = \frac{\log_{10}(PAO_{penetration}[\%]/100)}{\text{Pressure drop}[Pa]/9.81} \times (-100) \quad \text{[Numerical formula 1]}$$

"Evaluation of Network"

A network was evaluated by observing a filter medium for an air filter with a scanning electron microscope (SU8010, manufactured by Hitachi High-Technologies Corporation) at a magnification of 10000 times. Evaluation criteria are as follows.

1: Cellulose nanofibers did not have a specific directionality, and are not aggregated or clustered, and a uniform network of the cellulose nanofibers was formed throughout a support (practical level).

2: Cellulose nanofibers did not have a specific directionality, and are not aggregated or clustered, and a uniform network of the cellulose nanofibers was partially formed (practical level).

3: There was a region in which cellulose nanofibers were partially oriented, but aggregation and clustering of the cellulose nanofibers were slightly observed, and a relatively uniform network of the cellulose nanofibers was formed (practically lower limit level).

4: The number of cellulose nanofibers per unit area was too small, and a uniform network of the cellulose nanofibers was not formed (practically unsuitable level).

5: There was a region in which cellulose nanofibers were oriented, aggregated, and clustered, and a uniform network of the cellulose nanofibers was not formed (practically unsuitable level).

Figure 1:
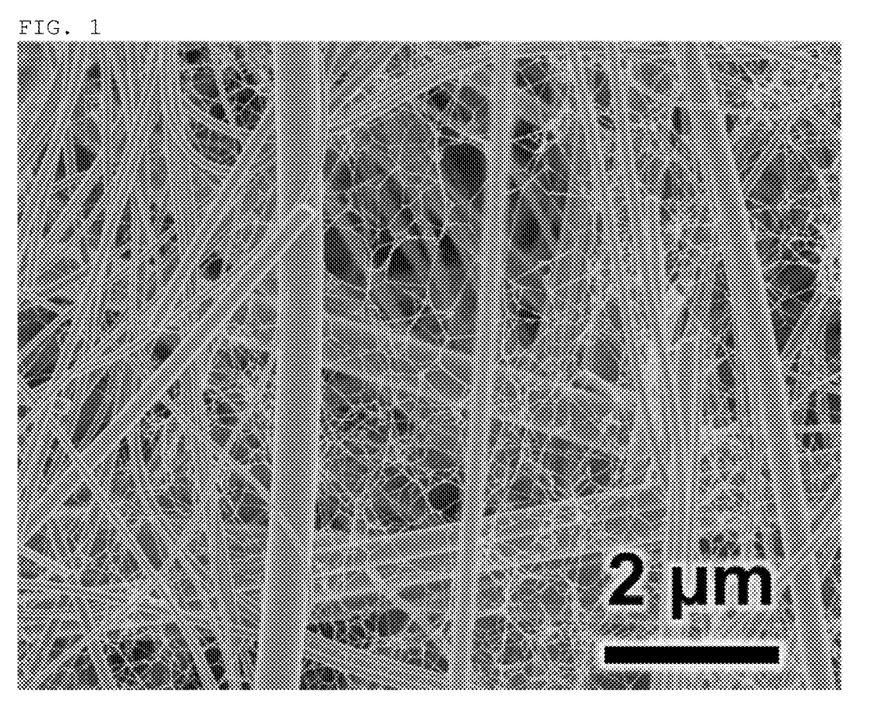
FIG. 1 is a diagram illustrating an observation image (observation magnification: 10000 times) of a filter medium for an air filter in Example 3 by SEM.

Examples 1 to 11 are examples using a nonwoven fabric made of glass fibers as a support, but had a smaller value of a particle penetration than the filter medium for an air filter as a support in Comparative Example 1, and obtained filter media for an air filter having high particle collection performance. In addition, Examples 1 to 10 had a higher PF value by 0.5 or more than the filter medium for an air filter as a support in Comparative Example 1, and obtained filter media for an air filter having a high collection efficiency and a low pressure drop. As an example, an observation image by SEM in Example 3 is illustrated in FIG. 1, a network of cellulose nanofibers is disposed uniformly without having a specific directionality in the filter medium for an air filter in Example 3.

Figure 2:
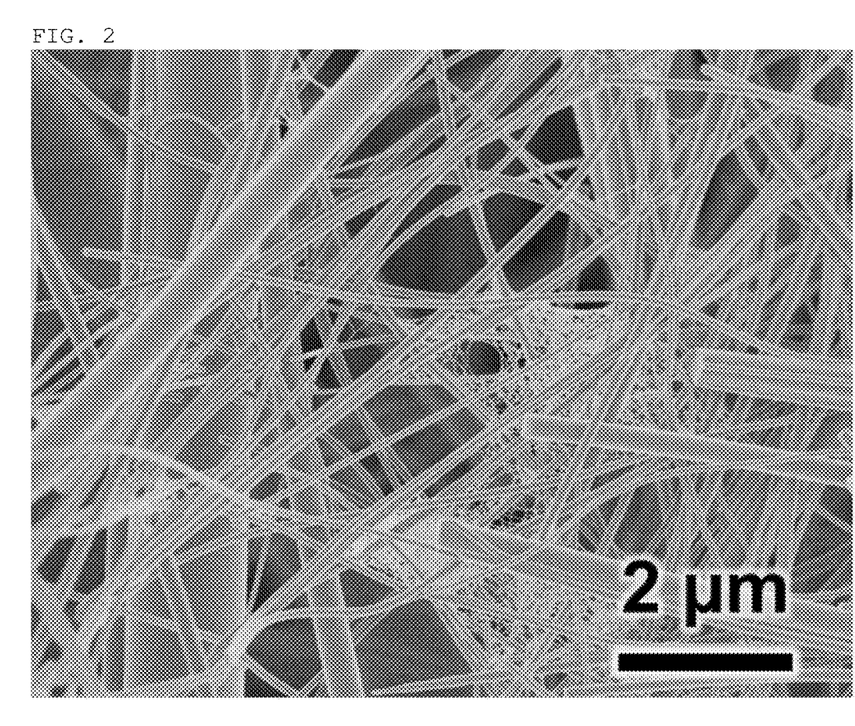
FIG. 2 is a diagram illustrating an observation image (observation magnification: 10000 times) of a filter medium for an air filter in Comparative Example 2 by SEM.

In Comparative Example 2, a dispersion medium contained no organic solvent, therefore cellulose nanofibers are aggregated around ice crystals when the dispersion medium was frozen, and as illustrated in FIG. 2, a uniform network of cellulose nanofibers was not formed. Therefore, particle collection performance of the filter medium for an air filter was not improved compared with Comparative Example 1 as a support. In Comparative Example 3, the solid content concentration of cellulose nanofibers in a dispersion medium was too low, and a network of cellulose nanofibers effective for capturing particles could not be formed in a filter medium for an air filter. In Comparative Example 4, the number average fiber diameter of cellulose nanofibers was large, the number of the cellulose nanofibers in the filter medium for an air filter was small, and a network of the cellulose nanofibers effective for capturing particles could not be formed.

Examples 12 to 14 are examples using a nonwoven fabric made of glass fibers and organic fibers as a support, but had a smaller value of a particle penetration than the filter medium for an air filter as a support in Comparative Example 5, had a PF value increased by 0.5 or more, and thereby obtained filter media for an air filter having a high collection efficiency and a low pressure drop. In Comparative Example 6, the solid content concentration of cellulose nanofibers in a dispersion medium was too high, therefore orientation of the cellulose nanofibers occurred in the dispersion medium, and a uniform network of the cellulose nanofibers could not be formed. In Comparative Example 7, the solid content concentration of cellulose nanofibers in a dispersion medium was too high, therefore orientation of the cellulose nanofibers occurred in the dispersion medium, a ratio of the adhesion amount of the cellulose nanofibers with respect to a support was too high, and therefore the density of the cellulose nanofibers increased. As a result, a uniform network of the cellulose nanofibers could not be formed.

The invention claimed is:

1. A method for manufacturing a filter medium for an air filter, the method comprising:
   causing a mixed solution containing cellulose nanofibers and a dispersion medium to adhere to an air-permeable support; and
   subsequently freeze-drying the resulting product,
   wherein the cellulose nanofibers have an average fiber diameter that is in a range of 1 to 50 nm,
   wherein the dispersion medium is a mixed dispersion medium of water and a water-soluble organic solvent, and
   wherein the cellulose nanofibers in the mixed solution have a solid content concentration in a range of 0.001 to 0.150% by mass
   wherein the cellulose nanofibers have an adhesion amount ratio with respect to the air-permeable support in a range of 0.001 to 0.200% by mass.

2. The method for manufacturing a filter medium for an air filter according to claim 1, the method further comprising:
   setting an ambient temperature of the mixed solution adhered to the air-permeable support to a temperature equal to or lower than a melting point of the mixed solution in the freeze-drying.

3. The method for manufacturing a filter medium for an air filter according to claim 1, wherein the filter medium has a PF value that is higher than a PF value of a support by 0.5 or more when a surface wind speed is 5.3 cm/sec and a target particle diameter is 0.10 to 0.15 µm.

* * * * *